United States Patent
Yu et al.

(10) Patent No.: US 9,979,019 B2
(45) Date of Patent: May 22, 2018

(54) COMPOSITE POSITIVE ELECTRODE ACTIVE MATERIAL, METHOD OF MANUFACTURING THE SAME, POSITIVE ELECTRODE INCLUDING THE COMPOSITE POSITIVE ELECTRODE ACTIVE MATERIAL, AND LITHIUM SECONDARY BATTERY INCLUDING THE POSITIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Byongyong Yu, Suwon-si (KR); Donghan Kim, Suwon-si (KR); Jinhwan Park, Seoul (KR); Jayhyok Song, Suwon-si (KR); Andrei Kapylou, Suwon-si (KR); Sungjin Ahn, Anyang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 222 days.

(21) Appl. No.: 14/920,968

(22) Filed: Oct. 23, 2015

(65) Prior Publication Data
US 2016/0190575 A1 Jun. 30, 2016

(30) Foreign Application Priority Data
Dec. 30, 2014 (KR) ........................ 10-2014-0194332

(51) Int. Cl.
| | |
|---|---|
| *H01M 4/485* | (2010.01) |
| *H01M 4/58* | (2010.01) |
| *H01M 4/505* | (2010.01) |
| *H01M 10/052* | (2010.01) |
| *H01M 10/0525* | (2010.01) |
| *C01G 53/04* | (2006.01) |
| *C01G 53/00* | (2006.01) |

(52) U.S. Cl.
CPC ............ *H01M 4/485* (2013.01); *C01G 53/50* (2013.01); *H01M 4/505* (2013.01); *H01M 4/582* (2013.01);
(Continued)

(58) Field of Classification Search
CPC ...... H01M 4/485; H01M 4/505; H01M 4/582; H01M 10/052; C01G 53/50;
(Continued)

(56) References Cited

U.S. PATENT DOCUMENTS

| | | | |
|---|---|---|---|
| 6,103,422 A | 8/2000 | Kanai | |
| 7,285,357 B2 * | 10/2007 | Jordy | H01M 4/131 |
| | | | 252/182.1 |

(Continued)

FOREIGN PATENT DOCUMENTS

| | | |
|---|---|---|
| JP | 3181296 B2 | 4/2001 |
| JP | 2004-171909 A | 6/2004 |

(Continued)

OTHER PUBLICATIONS

Johnson et al., "Synthesis, Characterization and Electrochemistry of Lithium Battery Electrodes: xLi2MnO3 • (1-x) LiMn0.333Ni0.333 O2(0≤x≤0.7)", Chem. Mater., vol. 20, 2008, pp. 6095-6106.

*Primary Examiner* — Gregg Cantelmo
(74) *Attorney, Agent, or Firm* — Cantor Colburn LLP

(57) ABSTRACT

A composite positive electrode active material including: an overlithiated layered oxide (OLO) including vanadium (V) and magnesium (Mg), wherein the vanadium and magnesium have a molar ratio of about 1:2. Also a method of manufacturing the composite positive electrode active material, a positive electrode including the composite positive electrode, and a lithium battery including the positive electrode.

18 Claims, 7 Drawing Sheets

(52) U.S. Cl.
CPC ..... *H01M 10/0525* (2013.01); *C01P 2002/50* (2013.01); *C01P 2002/52* (2013.01); *C01P 2002/70* (2013.01); *C01P 2004/03* (2013.01); *C01P 2004/61* (2013.01); *C01P 2006/10* (2013.01); *H01M 10/052* (2013.01); *Y02T 10/7011* (2013.01)

(58) Field of Classification Search
CPC .............. C01P 2002/50; C01P 2002/52; C01P 2002/70; C01P 2004/03; C01P 2004/61; C01P 2006/10; Y02T 10/7011
See application file for complete search history.

(56) References Cited

U.S. PATENT DOCUMENTS

| | | |
|---|---|---|
| 7,314,682 B2 | 1/2008 | Thackeray et al. |
| 8,187,752 B2 | 5/2012 | Buckley et al. |
| 8,227,100 B2 * | 7/2012 | Inagaki ................ H01M 4/485 423/594.16 |
| 2002/0192148 A1 * | 12/2002 | Kweon ................ B82Y 30/00 423/592.1 |
| 2007/0218359 A1 * | 9/2007 | Shimizu ................ H01M 4/505 429/223 |
| 2007/0292757 A1 | 12/2007 | Watanabe et al. |
| 2011/0244331 A1 | 10/2011 | Karthikeyan et al. |
| 2014/0162124 A1 | 6/2014 | Watanabe et al. |
| 2014/0356715 A1 | 12/2014 | Lee et al. |
| 2015/0010823 A1 | 1/2015 | Yu et al. |

FOREIGN PATENT DOCUMENTS

| | | | | |
|---|---|---|---|---|
| JP | 2006331942 A | * | 12/2006 | |
| JP | 2008282667 A | * | 11/2008 | |
| JP | 2009146612 A | * | 7/2009 | ............ H01M 4/485 |
| KR | 1020130063699 A | | 6/2013 | |
| KR | 1020130095572 A | | 8/2013 | |
| KR | 1020150004645 A | | 1/2015 | |

* cited by examiner

COMPOSITE POSITIVE ELECTRODE ACTIVE MATERIAL, METHOD OF MANUFACTURING THE SAME, POSITIVE ELECTRODE INCLUDING THE COMPOSITE POSITIVE ELECTRODE ACTIVE MATERIAL, AND LITHIUM SECONDARY BATTERY INCLUDING THE POSITIVE ELECTRODE

CROSS REFERENCE TO RELATED APPLICATION

This application claims priority to and the benefit of Korean Patent Application No. 10-2014-0194332, filed on Dec. 30, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a composite positive active material, a method of manufacturing the same, a positive electrode including the composite positive active material, and a lithium secondary battery including the positive electrode.

2. Description of the Related Art

As a lithium battery has been used as the actuating power of vehicles or portable electronic devices, research to improve the capacity of the lithium battery has been actively done. In addition, as various devices become complex and highly functional, the lithium battery that is used as the energy source of these devices desirably provides a high-voltage, high specific energy, and high-density.

In order to implement a lithium battery that satisfies these needs, an improved positive active material, which provides improved lifespan and capacity characteristics, and at the same time has a relaxed reduction in voltage characteristics upon repeated charge and discharge, is needed.

SUMMARY

Provided are a composite positive active material and a method of manufacturing the same, wherein the composite positive active material has improved structural stability and has improved electrochemical characteristics.

Provided is a positive electrode including the composite positive active material.

Provided is a lithium secondary battery including the positive electrode and having improved lifespan characteristics.

Additional aspects will be set forth in part in the description which follows and, in part, will be apparent from the description.

According to an aspect, a composite positive electrode active material includes: an overlithiated layered oxide (OLO) including vanadium (V) and magnesium (Mg), wherein the vanadium and the magnesium have a molar ratio of about 1:2.

According to an aspect, a positive electrode includes the composite positive electrode active material.

According to another aspect, a lithium secondary battery includes the positive electrode.

According to another aspect, a method of manufacturing the composite positive electrode active material includes: mixing a metal precursor for forming an overlithiated layered oxide (OLO), a vanadium precursor which includes vanadium, and a magnesium precursor which includes magnesium to form a precursor mixture, wherein a molar ratio of the vanadium to the magnesium in the precursor mixture is about 1:2; drying the precursor mixture to form a dried mixture; mixing the dried mixture with a lithium precursor; and heat treating the dried mixture and the lithium precursor to manufacture the composite positive electrode active material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
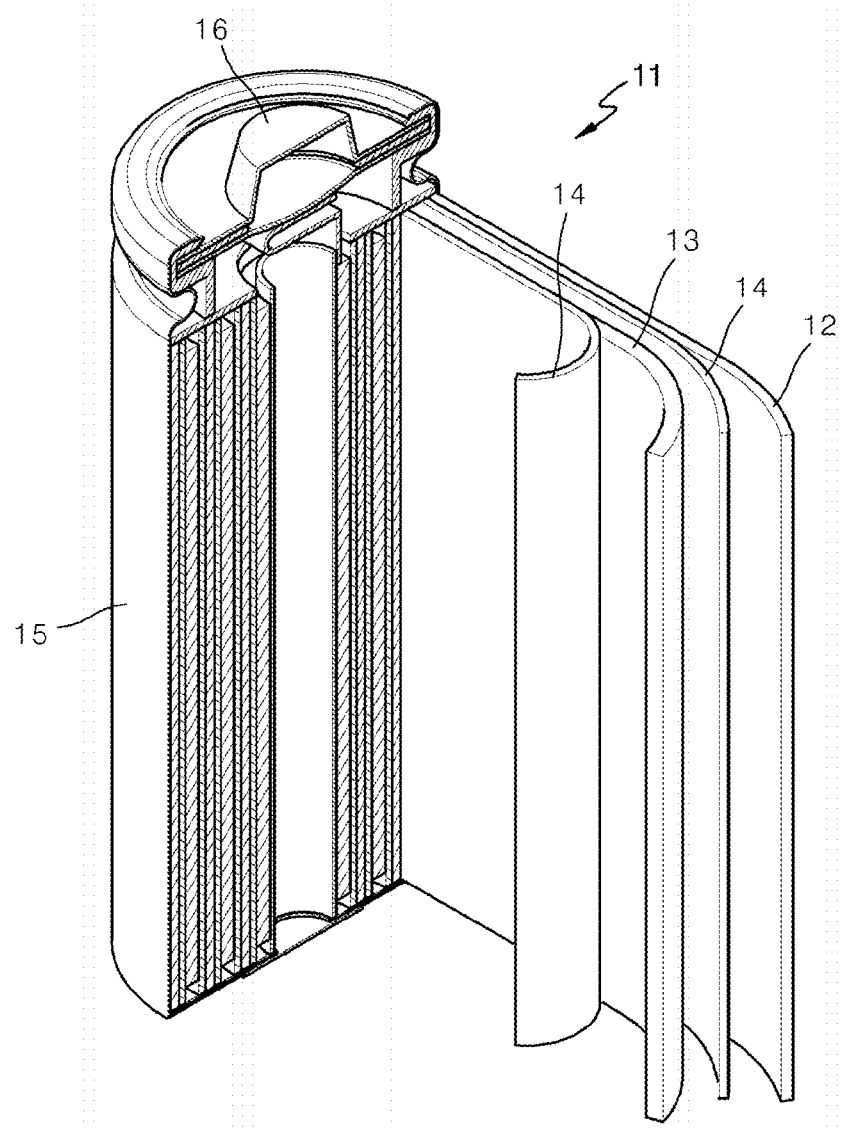
FIG. 1 is an exploded perspective view of an embodiment of a lithium battery.

Reference will now be made in detail to exemplary embodiments of a composite positive electrode active material, a method of manufacturing the composite positive electrode active material, a positive electrode that includes the composite positive electrode active material, and a lithium battery that includes the positive electrode, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In an aspect, there is provided a composite positive electrode active material including an overlithiated layered oxide (OLO) in which vanadium (V) and magnesium (Mg) have a molar ratio of about 1:2. A molar content of lithium in the overlithiated layered oxide is greater than an anion content, wherein the anion content is a total molar content of F, Cl, Br, and I, if present, and one half of a molar content of oxygen and sulfur, if present.

The composite positive electrode active material may include $V^{5+}$ and $Mg^{2+}$ at a molar ratio of about 1:2, e.g., about 0.9:2 to about 1.1:2, about 0.95:2 to about 1.05:2, or about 0.99:2 to about 1.01:2. In this regard, the average oxidation number of a cation-doping element becomes about +3, and thus the stability of the composite positive electrode active material may be increased when it is doped and has a layered structure. In addition, the doping with such complex elements, e.g., V and Mg, may improve lifespan characteristics by inhibiting capacity reduction caused by charge and discharge and by inhibiting changes in the discharge profile during high-voltage operation.

When the molar ratio of V and Mg in the composite positive electrode active material is not within the foregoing range, the charge balance of the composite positive electrode active material may not be in neutral, and thus the composite positive electrode active material may be structurally unstable.

The composite positive electrode active material may be a compound represented by Formula 1 below.

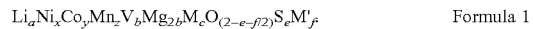
$$Li_aNi_xCo_yMn_zV_bMg_{2b}M_cO_{(2-e-f/2)}S_eM'_f \qquad \text{Formula 1}$$

In Formula 1, $1.0<a\leq1.4$, $0<x<1$, $0\leq y<1$, $0<z<1$, $0<b<1$, $0\leq c<1$, $0<x+y+z+b+2b+c<1$, $0\leq e<1$, and $0\leq f<1$; M may be at least one selected from gallium (Ga), silicon (Si), tungsten (W), molybdenum (Mo), iron (Fe), chromium (Cr), copper (Cu), zinc (Zn), titanium (Ti), aluminum (Al), and boron (B); and M' may be at least one selected from F, Cl, Br, and I.

In Formula 1, b denotes a stoichiometric ratio of V, and may be in a range from about 0.001 to about 0.03, e.g., about 0.002 to about 0.02, or about 0.005 to about 0.01. In another embodiment, b in Formula 1 may be in a range from about 0.0017 to about 0.008. When b in Formula 1 is within the foregoing range, the overlithiated layered oxide (OLO) may be structurally stabilized to an oxidation-reduction reaction during the charge and discharge. Accordingly, the lifespan characteristics of the lithium secondary battery may be improved during high-voltage operation.

In Formula 1, $1.05\leq a<1.5$, e.g., $1.1<a<1.3$, and $0.471<z<1$, e.g., $0.496\leq z<1$.

As such, the composite positive electrode active material may include a high Mn amount of at least 40 mole percent (mol %), or at least 50 mol %, such as 40 mol % to 60 mol %, based on a total moles of Ni Co, Mn, V, Mg, and M, and, while not wanting to be bound by theory, it is understood that inclusion of such a high amount of Mn and lithium may result in a battery having improved capacity.

In the compound of Formula 1, the cationic dopants, e.g., V and Mg, may be included in a crystal structure of the overlithiated layered oxide at a position of a transition metal, e.g., at least one selected from Ni, Co, and Mn, and the S and M', if present, may be included at a position of an oxygen in the crystal structure of the overlithiated layered oxide.

In Formula 1, $0.8\leq x+y+z+b+2b+c<1$, $0.002\leq c\leq 0.03$, and $0.03\leq e\leq 0.07$.

The compound of Formula 1 may be, for example, a compound represented by Formula 2 below:

$$Li_aNi_xCo_yMn_zV_bMg_{2b}M_cO_2. \quad \text{Formula 2}$$

In Formula 2, 1.0<a≤1.4, 0<x<1, 0≤y<1, 0<z<1, 0<b<1, 0≤c<1, and 0<x+y+z+b+2b+c<1; and M may be at least one selected from Ga, Si, W, Mo, Fe, Cr, Cu, Zn, Ti, Al, and B.

In Formula 2, 0.8≤x+y+z+b+2b+c<1.

An example of the compound of Formula 2 may be a compound represented by Formula 3 below:

$$Li_aNi_xCo_yMn_zV_bMg_{2b}O_2. \quad \text{Formula 3}$$

In Formula 3, 1.0<a≤1.4, 0<x<1, 0≤y<1, 0<z<1, 0<b<1, and 0<x+y+z+b+2b<1.

In Formulas 2 and 3, b may be in a range from about 0.001 to about 0.03, e.g., about 0.005 to about 0.01, or may be in a range from about 0.0017 to about 0.008. In Formulas 2 and 3, 1.05≤a<1.5, e.g., 1.1<a<1.3, and 0.471<z<1, e.g., 0.496≤z<1.

The composite positive electrode active material may be of the formula $Li_{1.167}Ni_{0.181}Co_{0.125}Mn_{0.515}V_{0.004}Mg_{0.008}O_2$, $Li_{1.167}Ni_{0.175}Co_{0.125}Mn_{0.508}V_{0.008}Mg_{0.016}O_2$, or $Li_{1.167}Ni_{0.163}Co_{0.125}Mn_{0.496}V_{0.017}Mg_{0.034}O_2$.

The composite positive electrode active material may comprise particles having any suitable shape, and in a preferred embodiment comprises spherical particles. A primary particle of the composite positive electrode active material may have an average diameter ($D_{50}$) in a range from about 100 nanometers (nm) to about 250 nm, about 120 nm to about 230 nm, or about 140 nm to about 200 nm, and a secondary particle of the composite positive electrode active material may have an average diameter $D_{50}$ in a range from about 2 μm to about 20 μm, e.g., about 2 μm to about 12 μm, or about 5 μm to about 12 μm. Here, the term "average diameter $D_{50}$" refers to a value of particle diameters measured at 50 volume % of the cumulative volume in particle diameter distribution. When the average particle diameter $D_{50}$ is within the foregoing range, an electrode plate manufacturing process may be more easily performed.

In an embodiment, X-ray diffraction (XRD) analysis may confirm that the composite positive electrode active material has an OLO structure, and inductively coupled plasma (ICP) analysis may determine a composition of each constituent element, e.g., the amounts of V and Mg.

In the XRD analysis using Cu-kα radiation with respect to the composite positive electrode active material of Formula 1, peaks appear at a Bragg 2θ angle between 36° and 37°. Here, peaks appearing at a Bragg 2θ angle between 36.85° and 36.95° correspond to a (101) plane of $LiMeO_2$ (e.g., $LiNiCoMnO_2$) that constitutes a layered structure.

The composite positive electrode active material may have a powder density in a range from about 2.4 grams per cubic centimeter ($g/cm^3$) to about 3.0 $g/cm^3$. When the composite positive electrode active material having such a powder density is used, a lithium battery may have improved voltage and lifespan characteristics.

Herein after, a method of manufacturing the composite positive electrode active material will be described in further detail.

The composite positive electrode active material may be manufactured by a method comprising: mixing a metal precursor for forming an overlithiated layered oxide (OLO), a vanadium precursor which comprises vanadium, and a magnesium precursor which comprises magnesium to form a precursor mixture, wherein a molar ratio of the vanadium to the magnesium in the precursor mixture is about 1:2; drying the precursor mixture to form a dried mixture; mixing the dried mixture with a lithium precursor; and heat treating the dried mixture and the lithium precursor to manufacture the composite positive electrode active material. The method may comprise obtaining a mixture of precursors by mixing a metal precursor for forming an OLO, a V precursor, and a Mg precursor; a second step of dispersing and drying the resultant mixture; and a third step of mixing the dried mixture with a lithium precursor and performing a heat treatment thereon.

The metal precursor for forming the OLO may include a Ni precursor which comprises Ni, a Mn precursor which comprises Mn, and a Co precursor which comprises Co.

In the step of mixing the metal precursor, the V precursor, the Mg precursor, and a solvent may be used to obtain a precursor mixture. Any suitable solvent may be used. Representative solvents include alcohols (e.g., methanol, ethanol, butanol); water; liquid carbon dioxide; aldehydes (e.g., acetaldehydes, propionaldehydes), formamides (e.g., N,N-dimethylformamide); ketones (e.g., acetone, methyl ethyl ketone, β-bromoethyl isopropyl ketone); acetonitrile; sulfoxides (e.g., dimethylsulfoxide, diphenylsulfoxide, ethyl phenyl sulfoxide); sulfones (e.g., diethyl sulfone, phenyl 7-quinolylsulfone); thiophenes (e.g., thiophene 1-oxide); acetates (e.g., ethylene glycol diacetate, n-hexyl acetate, 2-ethylhexyl acetate); and amides (e.g., propanamide, benzamide). A combination comprising at least one of the foregoing solvents may be used. In a preferred embodiment, the solvent may be water or an alcohol-based solvent, and the alcohol-based solvent may be ethanol. An amount of the solvent used herein may be in a range from about 200 parts by weight to about 3,000 parts by weight, based on 100 parts by weight of a total amount of the metal precursor, the V precursor, and the Mg precursor. When the amount of the solvent is within the range above, a mixture in which each of the precursors is evenly mixed may be obtained. Such a mixing may be performed at a temperature from about 20° C. to about 80° C., e.g., at a temperature of about 60° C.

Contrary to a method including a step of preparing a co-precipitation precursor of a transition metal and mixing the co-precipitation precursor with a cationic dopant, in an embodiment, the starting material comprising a transition metal, e.g., Ni, Co, and Mn, is mixed with a cationic dopant, e.g., the V precursor and the Mg precursor, so as to obtain a precursor mixture in which the transition metal and the doping element, e.g., V and Mg, are evenly present. Accordingly, the primary particles of the composite positive electrode active material may be more evenly formed.

The Ni precursor, the Mn precursor, and the Co precursor may each independently be an acetate, nitrate, hydroxide, oxide, or sulfate, each of which may include at least one selected from Ni, Mn, and Co, but they are not limited thereto.

The V precursor and the Mg precursor may each independently be a nitrate, acetate, oxide, or sulfate, each of which includes V and/or Mg, but they are not limited thereto.

The V precursor may be, for example, at least one selected from $NH_4VO_3$, $V_2O_5$, and $VCl_3$. The Mg precursor may be, for example, at least one selected from $Mg(OH)_2$, $Mg(SO_4)$, and $MgCl_2$.

The V precursor and the Mg precursor may be included in a range from about 0.1 mole percent (mol %) to about 3 mol %, e.g., about 0.2 mol % to about 2 mol %, or about 0.5 mol % to about 1 mol %, based on a total amount of the transition metal of the composite positive electrode active material. Here, a molar ratio of the V precursor to the Mg precursor may be about 1:2, e.g., about 0.9:2 to about 1.1:2, about 0.95:2 to about 1.05:2, or about 0.99:2 to about 1.01:2. As such, an average oxidation number of V and Mg in the composite positive electrode active material may be about +3, and accordingly, the composite positive electrode active material may maintain overall charge neutrality of about 0, so as to adapt for the charge balance. In addition, through an excellent oxidation-reaction during the charge and discharge, the OLO may be structurally stabilized. In this regard, the charge and discharge capacity of the lithium secondary battery may be increased, and accordingly, the lifespan characteristics of the lithium secondary battery may be improved upon high-voltage operation.

The precursor mixture may be dispersed, and the step of dispersing may be performed by milling.

The milling may be performed by using a ball mall or a bead mill, but is not limited thereto. The precursor mixture after the dispersing may have an average diameter in a range from about 5 nm to about 100 nm, e.g., about 10 nm to about 50 nm. When the average particle diameter of the precursor mixture is within the foregoing range, an electrode plate manufacturing process may be more easily performed.

When performing the milling method, a solvent, such as an alcohol-based solvent, e.g., ethanol, may be used to increase a mixing efficiency.

An amount of the solvent may be in a range from about 100 parts by weight to about 3,000 parts by weight, based on 100 parts by weight of a total amount of the precursors. When the amount of the solvent is within the foregoing range, a mixture in which the precursors are evenly dispersed may be result.

The dispersion may be conducted for any suitable time, and may be performed for about 20 minutes to about 10 hours, e.g., about 1 hour to about 3 hours or about 30 minutes to about 1 to 2 hours. When the dispersion time is within the foregoing range, the precursors and the doping materials may be evenly dispersed in a very small size, resulting in improved properties.

The drying, e.g. spray-drying, may be performed at a rate in a range from about 5 millimeters per minute (mm/min) to about 30 mm/min, e.g., about 10 mm/min to about 15 mm/min. In addition, the spray-drying may be performed at a temperature of about 150° C. to about 300° C., e.g., 150° C. to about 300° C. When the spray-drying is performed at the rate and the temperature within the foregoing ranges, a precursor in which the transition metal materials and the cationic doping material are evenly mixed may be result. Accordingly, the doping materials may be evenly doped with a crystalline structure.

The lithium precursor may be, for example, at least one selected from lithium carbonate ($Li_2CO_3$), lithium sulfate ($Li_2SO4$), lithium nitrate ($LiNO_3$), and lithium hydroxide (LiOH). Here, the amount of the lithium precursor is stoichiometrically selected to provide a composition of the composite positive electrode active material of Formula 1.

The heat treatment may be performed at a temperature of about 600° C. to about 900° C., e.g., about 700° C. to about 750° C. When the heat treatment is performed at the temperature within the foregoing range, improved yield may be provided, leading to excellent crystalline characteristics. In addition, the heat treatment time may be selected according to the heat treatment temperature. For example, the heat treatment may be formed in air or under a nitrogen atmosphere for about 5 hours to about 15 hours, e.g., about 10 hours to about 12 hours.

The lithium compound may be, for example, at least one selected from $Li_2CO_3$, $Li_2SO_4$, $LiNO_3$, and LiOH. Here, the lithium compound may be combined with the precursor mixture to provide a stoichiometric composition of the composite positive electrode active material of Formula 1.

In the third step of mixing the dried mixture with a lithium precursor and performing the heat treatment thereto, an anionic doping material precursor may be further used to provide S and/or M' in Formula 1. Here, an amount of the anionic doping material precursor may be stoichiometrically selected to provide a composition of the composite positive electrode active material of Formula 1.

The anionic doping material may comprise at least one selected from F, S, Cl, Br, and I, and may comprise at least one selected from LiF, $Li_2S$, LiCl, and LiBr. A preferred example of the anionic doping material is LiF, but the anionic doping material is not limited thereto.

In an embodiment, a coating layer may be formed on the composite positive electrode active material. The inclusion of such a coating layer may lead to the improvement of charge and discharge characteristics, lifespan characteristics, and high-voltage characteristics of a lithium battery when a positive electrode including the composite positive electrode active material is used in the lithium battery.

In an embodiment, the coating layer may include a carbonaceous material, such as carbon nanotube, fullerene, graphene, and carbon fiber, a conductive polymer, such as polyaniline, polythiophene, or polypyrrole, a metal oxide, such as silica ($SiO_2$), alumina ($Al_2O_3$), a zirconium oxide ($ZrO_2$), or a titanium oxide ($TiO_2$), and a metal, such as would be provided by $AlF_3$, CsF, KF, LiF, NaF, RbF, or TiF.

According to another aspect of an embodiment, there is provided a positive electrode including the composite positive electrode active material.

According to another aspect, there is provided a lithium secondary battery including the positive electrode.

In the manufacturing of the positive electrode, the positive electrode active materials that are known in the art may be used in addition to the composite positive electrode active material described above.

The additional positive electrode active materials may be at least one selected from a lithium-cobalt oxide, a lithium-nickel-cobalt-Manganese oxide, a lithium-nickel-cobalt-aluminum oxide, a lithium-iron-phosphours oxide, and a lithium-manganese oxide, but is not limited thereto. Any suitable material available as a positive electrode active material in the art may be used.

The first electrode active material may include a compound represented by one of the formulas, e.g., $Li_aA_{1-b}B'_bD_2$ (wherein $0.90 \le a \le 1.8$ and $0 \le b \le 0.5$); $Li_aE_{1-b}B'_bO_{2-c}D_c$ (wherein, $0.90 \le a \le 1.8$, $0 \le b \le 0.5$, and $0 \le c \le 0.05$); $LiE_{2-b}B'_bO_{4-c}D_c$ (wherein, $0 \le b \le 0.5$ and $0 \le c \le 0.05$); $Li_aNi_{1-b-c}Co_bB'_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F_\alpha$ (wherein, $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (wherein, $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F_\alpha$ (wherein, $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_2$ (wherein, $0.90 \le a \le 1.8$, $0 \le b \le 0.5$, $0 \le c \le 0.05$, and $0 < \alpha < 2$); $Li_aNi_bE_cG_dO_2$ (wherein, $0.90 \le a \le 1.8$, $0 \le b \le 0.9$, $0 \le c \le 0.5$, and $0.001 \le d \le 0.1$); $Li_aNi_bCo_cMn_dGeO_2$ (wherein, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001 \le b \le 0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In formulas above, A may be Ni, Co, Mn, or a combination thereof; B' may be Al, Ni, Co, Mn, Cr, Fe, Mg, Sr, V, a rare-earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

A positive electrode may be prepared as follows.

A positive electrode active material composition in which a positive active material, a binder, and a solvent are mixed is prepared.

A conductive agent may be further added to the positive electrode active material composition.

The positive electrode active material composition may be directly coated and dried on a metal collector, so as to prepare a positive electrode plate. Alternatively, the positive electrode active material composition may be cast on a separate support, and then, a film exfoliated from the support is laminated on a metal collector, so as to prepare a positive electrode plate.

As a positive electrode active material, the composite positive electrode active material according to an exemplary embodiment may be used. In addition to the composite positive electrode active material described above, a first electrode active material that is used in a lithium secondary battery may be further included.

The first positive electrode active material may include at least one selected from a lithium-cobalt oxide, a lithium-nickel-cobalt-manganese oxide, a lithium-nickel-cobalt-aluminum oxide, a lithium-iron-phosphours oxide, and a lithium-manganese oxide, but is not limited thereto. Any suitable material available as a positive electrode active material in the art may be used.

A conductive agent, a binder, and a solvent used in the positive electrode active material composition may be identical to those used in a negative electrode active material composition. In addition, a plasticizer may be further added to the positive electrode active material composition and/or the negative electrode active material composition, so as to prepare pores in electrode plates.

Amounts of the positive electrode active material, the conductive agent, the binder, and the solvent may be determined by one of skill in the art without undue experimentation. According to use and configuration of the lithium battery, at least one of the conductive agent, the binder, and the solvent may be omitted.

A negative electrode may be prepared in the substantially same manner, except in preparing the positive electrode, a negative electrode active material is used instead of a positive electrode active material.

The negative electrode active material may include at least one selected from a carbonaceous material, silicone, a silicon oxide, a silicon-based alloy, a silicon-carbonaceous composite, tin, a tin-based alloy, a tin-carbon composite, and a metal oxide.

The carbonaceous material may include crystalline carbon, amorphous carbon, or a mixture thereof. The crystalline carbon may be natural or artificial graphite of shapeless, plate, flake, sphere, or fiber form. The amorphous carbon may be soft carbon (low-temperature sintered carbon), hard carbon, a mesophase pitch carbide, sintered coke, graphene, carbon black, fullerene soot, carbon nanotube, carbon fiber, or the like, but is not limited thereto. Any suitable material available as the negative active material in the art may be used.

The negative electrode active material may be at least one selected from the group consisting of $SiO_x$ ($0 \leq x < 2$, e.g., 0.5 to 1.5), Sn, $SnO_2$, a mixture of silicon-containing metal alloy, and a mixture thereof. The metal capable of forming the silicon alloy may be at least one selected from the group consisting of Al, Sn, Ag, Fe, Bi, Mg, Zn, in, Ge, Pb, and Ti.

The negative electrode active material may comprise at least one selected from a metal and/or metalloid that is alloyable with lithium, an alloy of the metal and/or metalloid, and an oxide of the metal and/or metalloid. For example, the metal and/or metalloid that is alloyable with lithium may be Si, Sn, Al, Ge, Pb, Bi, a SbSi—Y' alloy (where Y' is an alkali metal, an alkaline earth metal, a Group 13 element, a Group 14 element, a transition metal, a rare-earth element, or a combination thereof and is not Si), a Sn—Y'' alloy (where Y'' is an alkali metal, an alkaline earth metal, a Group 13 element, a Group 14 element, a transition metal, a rare-earth element, or a combination thereof and is not Sn), or $MnO_x$ ($0 < x \leq 2$). The element Y' and Y'' may each independently be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. For example, the oxide of the metal/metalloids may be a lithium titanium oxide, a vanadium oxide, a lithium vanadium oxide, $SnO_2$, or $SiO_x$ ($0 \leq x < 2$).

For example, the negative electrode active material may include at least one element selected from the group consisting of a Group 13 element, a Group 14 element, and a Group 15 element of the periodic table.

For example, the negative electrode active material may include at least one element selected from the group consisting of Si, Ge, and Sn.

Amounts of the negative electrode active material, the conductive agent, the binder, and the solvent may be determined by one of skill in the art without undue experimentation.

A separator is disposed between the positive electrode and the negative electrode, and may use an insulating-thin film that has high ion permeability and mechanical strength.

The separator may have a pore diameter in a range from about 0.01 μm to about 10 μm and a thickness in a range from about 5 μm to about 20 μm. The separator having a pore diameter and a thickness within these ranges may be an olefin polymer, such as polypropylene; a sheet or a non-woven fabric including glass fibers or polyethylene. When a solid polymeric electrolyte is used as an electrolyte, the solid polymeric electrolyte may also serve as a separation.

Examples of the olefin polymer are polyethylene, polypropylene, and polyvinylidene fluoride, and the olefin polymer may have a multilayer structure including two or more polymer layers. That is, the separator may have a mixed multilayer structure, such as a two-layer separator of polyethylene/polypropylene, a three-layer separator of polyethylene/polypropylene/polyethylene, and a three-layer separator of polypropylene/polyethylene/polypropylene.

A lithium salt-containing non-aqueous electrolyte may comprise a non-aqueous electrolyte and a lithium salt.

The non-aqueous electrolyte may be a non-aqueous electrolytic solution, an organic solid electrolyte, or an inorganic solid electrolyte.

The non-aqueous electrolytic solution may include an organic solvent, and any suitable material available as the organic solvent in the art may be used. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropylcarbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N-dimethylformamide, N,N-dimethylacetamide, N,N-dimethylsulfoxide, dioxane, 1,2-dimethoxyethane, sulforane, dichloroethane, chlorobenzene, nitrobenzene, diethylene glycol, tetrahydrofuran, dimethyether, or a mixture thereof.

The organic solid electrolyte may be, for example, a polyethylene derivative, a polyethylene oxide derivative, a polypropylene oxide derivative, a phosphate ester polymer, polyagitation lysine, polyester sulfide, polyvinyl alcohol, polyvinylidene fluoride, or a polymer containing an ionic dissociable group.

The inorganic solid electrolyte may be, for example, a Li-based nitride, such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, a halogenide, or a sulfate.

The lithium salt is a material that is easily dissolved in the non-aqueous electrolyte, and examples thereof include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), $LiCl$, $LiI$, or a mixture thereof. In addition, in consideration of the improvement of charge and discharge characteristics and flame retardant, the non-aqueous electrolyte may further include, for example, pyridine, triethylphosphate, triethanolamine, cyclic ether, ethylenediamine, n-glyme, hexaphosphoric triaminde, nitrobenzene derivative, sulfur, quinoneimine dye, N-substituted oxazolidinone, N,N-substituted imidazolidine, ethylene glycol dialkyl ether, ammonium salt, pyrrole, 2-methoxy ethanol, or aluminum trichloride. If necessary, to provide non-combustibility, a halogen-containing solvent, such as carbon tetrachloride or ethylene trifluoride, may be further used.

Referring to FIG. 1, a lithium secondary battery 11 includes a positive electrode 13, a negative electrode 12, and a separator 34. The positive electrode 13, the negative electrode 12, and the separator 14 are wound or folded to be accommodated in a battery case 15. Subsequently, an organic electrolytic solution is loaded into the battery case 15, and then, sealed with a cap assemble 16, thereby completing the preparation of the lithium battery 11. The battery case 15 may be cylindrical, rectangular, or thin film-shaped. For example, the lithium battery 11 may be a thin film-type battery. Alternatively, the lithium battery 11 may be a lithium ion battery.

The separator 14 is disposed between the positive electrode 13 and the negative electrode 14 to form a battery assembly. A plurality of battery assemblies are stacked in a bi-cell structure, and then impregnated with an organic electrolytic solution, and the obtained structure is housed in a pouch, and then, sealed, thereby completing the preparation of a lithium ion polymer battery.

In addition, a plurality of the battery assemblies may be stacked on each other to form a battery pack, and the battery pack may be used in various devices that require high capacity and high output functions. For example, the battery pack may be used in a laptop, a smart phone, or an electric vehicle.

The lithium battery according to an exemplary embodiment has high-rate characteristics and excellent lifespan characteristics, and thus may be suitable to be applied to electric vehicles (EVs), e.g., a hybrid vehicle such as a plug-in hybrid electric vehicle (PHEV).

Hereinafter, one or more embodiments will be described in further detail with reference to the following examples. However, these examples shall not limit the scope of the disclosed embodiments.

EXAMPLES

Example 1: Manufacture of Composite Positive Electrode Active Material

A mixture of $Ni(OH)_2$, $Co(OH)_2$, $Mn_3O_4$, $NH_4VO_3$, and $Mg(OH)_2$ was added to distilled water, and then, evenly dispersed therein for 2 hours using a ball mill (including a $ZrO_2$ ball having a 0.3 mm particle diameter) to obtain a composition for forming a composite positive electrode active material. Here, regarding the amounts of each of the transition metal raw materials, a molar ratio of $Li_2MnO_3$:$Li(NiCoMnVMg)O_2$ was adjusted to 40:60, a molar ratio of Ni:Co:Mn was adjusted to 22.5:15.0:62.5, and a total molar ratio of i) lithium and ii) a mixture of manganese, nickel and cobalt was adjusted to 1.40:1.00.

Such starting materials, i.e., $Ni(OH)_2$, $Co(OH)_2$, $Mn_3O_4$, $NH_4VO_3$, and $Mg(OH)_2$, were mixed to provide a stoichiometric composite positive electrode active material of the formula $Li_{1.167}Ni_{0.181}Co_{0.125}Mn_{0.515}V_{0.004}Mg_{0.008}O_2$, wherein amounts of $NH_4VO_3$ and $Mg(OH)_2$ were determined when the amount of vanadium was 0.5 mol % and the amount of magnesium was 1.0 mol %, based on the total amount (1.0 mol) of the transition metals in the composite positive electrode active material.

The prepared composition for forming a composite positive electrode active material was subjected to a spray-drying method at a temperature of 245° C. at a rate of 15 millimeters per minute (mm/min), so as to obtain a precursor doped with vanadium and magnesium. Then, the precursor was mixed with $Li_2CO_3$ according to a solid-state synthesis method. The resultant mixture was heat-treated in air for 10 hours at a temperature of 700° C., thereby manufacturing a composite positive electrode active material of the formula $Li_{1.167}Ni_{0.181}Co_{0.125}Mn_{0.515}V_{0.004}Mg_{0.008}O_2$.

Example 2: Manufacture of Composite Positive Electrode Active Material

A composite positive electrode active material was manufactured in the same manner as in Example 1, except that in preparing a composition for forming a composite positive electrode active material, the same starting materials, i.e., $Ni(OH)_2$, $Co(OH)_2$, $Mn_3O_4$, $NH_4VO_3$, and $Mg(OH)_2$, were mixed to provide a stoichiometric composite positive electrode active material of the formula $Li_{1.167}Ni_{0.175}Co_{0.125}Mn_{0.508}V_{0.008}Mg_{0.016}O_2$, wherein amounts of $NH_4VO_3$ and $Mg(OH)_2$ were determined so that the amount of vanadium was 1.0 mol % and the amount of magnesium was 2.0 mol %, based on the total amount (1.0 mol) of the transition metals in the composite positive electrode active material.

Example 3: Manufacture of Composite Positive Electrode Active Material

A composite positive electrode active material was manufactured in the same manner as in Example 1, except that in preparing a composition for forming a composite positive electrode active material, the same starting materials, i.e., $Ni(OH)_2$, $Co(OH)_2$, $Mn_3O_4$, $NH_4VO_3$, and $Mg(OH)_2$, were mixed to provide a stoichiometric composite positive electrode active material of the formula $Li_{1.167}Ni_{0.163}Co_{0.125}Mn_{0.496}V_{0.017}Mg_{0.034}O_2$, wherein amounts of $NH_4VO_3$ and $Mg(OH)_2$ were determined when the amount of vanadium was 2.0 mol % and the amount of magnesium was 4.0 mol %, based on the total amount (1.0 mol) of the transition metals in the composite positive electrode active material.

Comparative Example 1: Manufacture of OLO

A composite positive electrode active material of the formula $Li_{1.167}Ni_{0.188}Co_{0.125}Mn_{0.521}O_2$ was manufactured in the same manner as in Example 1, except that in preparing a composition for forming a composite positive electrode active material, $NH_4VO_3$ and $Mg(OH)_2$ were not used as starting materials.

Comparative Example 2: Manufacture of OLO Doped with Vanadium

A composite positive electrode active material of the formula $Li_{1.167}Ni_{0.185}Co_{0.125}Mn_{0.519}V_{0.0042}O_2$ was manufactured in the same manner as in Example 1, except that in preparing a composition for forming a composite positive electrode active material, $Mg(OH)_2$ was not used as a starting material, and $Ni(OH)_2$, $Co(OH)_2$, $Mn_3O_4$, and $NH_4VO_3$ were mixed to provide a stoichiometric composite positive electrode active material of the formula $Li_{1.167}Ni_{0.185}Co_{0.125}Mn_{0.519}V_{0.0042}O_2$, wherein the amount of $NH_4VO_3$ was determined so that the amount of vanadium was 0.5 mol %, based on the total amount (1.0 mol) of the transition metals in the composite positive electrode active material.

Comparative Example 3: Manufacture of OLO Doped with Magnesium

A composite positive electrode active material of the formula $Li_{1.167}Ni_{0.183}Co_{0.125}Mn_{0.517}Mg_{0.0083}O_2$ was manufactured in the same manner as in Example 1, except that in preparing a composition for forming a composite positive electrode active material, $NH_4VO_3$ was not used as a starting material, and $Ni(OH)_2$, $Co(OH)_2$, $Mn_3O_4$, and $Mg(OH)_2$ were mixed to provide a stoichiometric composite positive electrode active material of the formula $Li_{1.167}Ni_{0.183}Co_{0.125}Mn_{0.517}Mg_{0.0083}O_2$, wherein the amount of $NH_4VO_3$ was determined so that the amount of magnesium was 1.0 mol %, based on the total amount (1.0 mol) of the transition metals in the composite positive electrode active material.

Comparative Example 4: Manufacture of OLO Doped with Vanadium and Magnesium

A composite positive electrode active material was manufactured in the same manner as in Example 1, except that in preparing a composition for forming a composite positive electrode active material, amounts of $NH_4VO_3$ and $Mg(OH)_2$ were determined so that the amount of vanadium was 0.5 mol % and the amount of magnesium was 0.5 mol %, based on the total amount (1.0 mol) of the transition metals in the composite positive electrode active material.

Comparative Example 5: Manufacture of OLO Doped with Vanadium and Magnesium

A composite positive electrode active material was manufactured in the same manner as in Example 1, except that in preparing a composition for forming a composite positive electrode active material, amounts of $NH_4VO_3$ and $Mg(OH)_2$ were determined so that the amount of vanadium was 1.0 mol % and the amount of magnesium was 0.5 mol %, based on the total amount (1.0 mol) of the transition metals in the composite positive electrode active material.

Manufacturing Example 1: Manufacture of Coin Half-Cell 92 wt % of the composite positive electrode active material of Example 1, 4 wt % of polyvinylidene fluoride (PVDF), and 4 wt % of acetylene black were mixed together, and then, the mixture was dispersed in N-methyl-2-pyrrolidone, so as to manufacture a slurry. Next, an aluminum foil having a thickness of 15 μm was coated with the slurry, and then, dried, so as to manufacture a positive electrode.

A porous polyethylene separator was disposed between the positive electrode and a Li metal-based negative electrode, and then, an electrolyte was added thereto, so as to manufacture a coin half-cell. Here, the electrolyte was a solution in which 1.3M $LiPF_6$ was dissolved in a mixed solution where fluoroethylene carbonate (FEC), dimethyl carbonate (DMC), and other additives were mixed at a mixing volume ratio of 15:45:40.

Manufacturing Examples 2 and 3: Manufacture of Coin Half-Cell

Coin half-cells were manufactured in the same manner as in Manufacturing Example, except that the composite positive electrode active materials of Examples 2 and 3 were each used instead of the composite positive electrode active material of Example 1.

Comparative Manufacturing Examples 1 to 5: Manufacture of Coin Half-Cells

Coin half-cells were manufactured in the same manner as in Manufacturing Example, except that the composite positive electrode active materials of Comparative Examples 1 to 5 were each used instead of the composite positive electrode active material of Example 1.

Evaluation Example 1: Scanning Electron Microscopy (SEM) Analysis

Figure 2A:
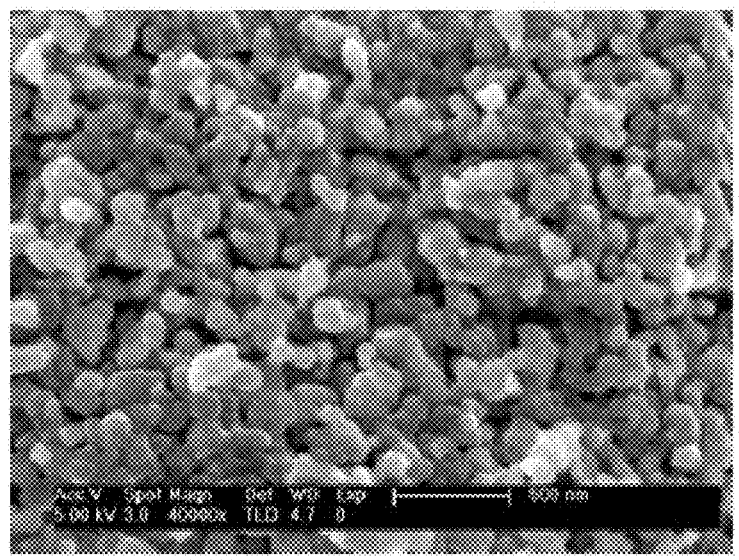
FIGS. 2A and 2B are scanning electron microscope (SEM) images of a composite positive electrode active material prepared according to Example 1.
Figure 2B:
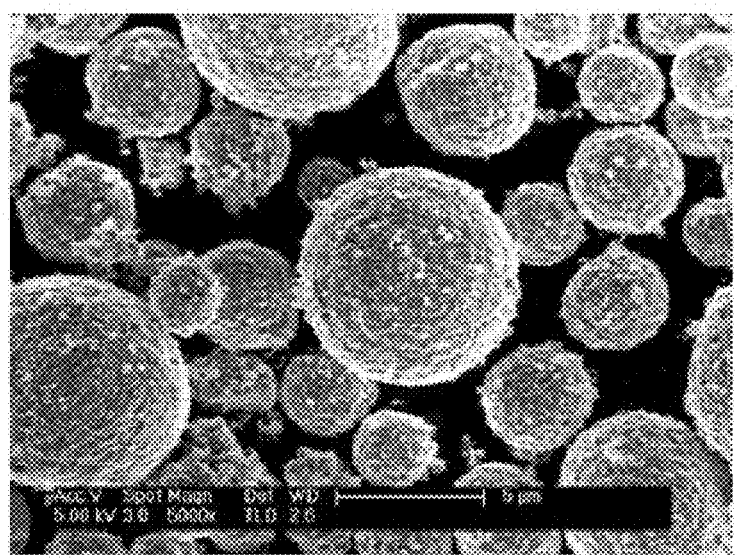

SEM analysis was carried out on the composite positive electrode active material of Example 1, and the analysis results are shown in FIGS. 2A and 2B. Here, the analysis device used herein was S-5500 (Hitachi company).

FIGS. 2A and 2B are SEM images of primary and secondary particles of the composite positive electrode active material of Example 1, each taken at a 20,000 magnification scale and a 40,000 magnification scale.

As shown in FIG. 2A, an average diameter of the primary particles was found to be about 175 nm, and as shown in FIG. 2B, spherical secondary particles were found to be formed in the composite positive electrode active material. In addition, it was confirmed that morphological changes of the spherical particles were not influenced by doping with cationic ions, e.g., vanadium and magnesium.

Evaluation Example 2: Inductively Coupled Plasma (ICP) Analysis

ICP analysis was carried out on the composite positive electrode active material of Example 1 to measure doping amounts, and the analysis results are shown in Table 1 below.

TABLE 1

| Division | Li | V | Mg | Ni | Co | Mn |
|---|---|---|---|---|---|---|
| | | | Amounts (mol) | | | |
| Example 1 | 1.41 | 0.004 | 0.008 | 0.227 | 0.149 | 0.610 |

Referring to Table 1, it was confirmed that vanadium and magnesium were doped with the composite positive electrode active material at a molar ratio of 1:2.

Evaluation Example 3: X-Ray Diffraction (XRD)

XRD analysis using Cu-kα radiation with respect to a lithium composite oxide was carried out on the composite positive electrode active material of Example 1. Here, the XRD was performed by using a diffractometer (Rigaku RINT2200HF+) using Cu-Kα radiation (1.540598 Å).

Figure 3A:
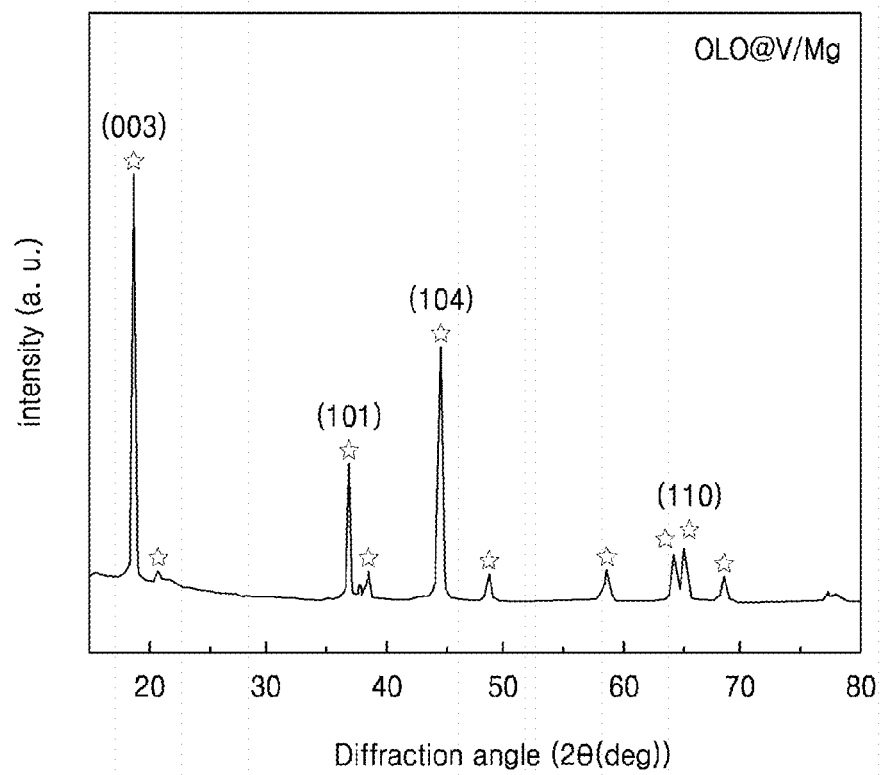
FIGS. 3A and 3B are graphs of intensity (arbitrary units, a.u.) versus diffraction angle (degrees two-theta, $2\theta$) showing results of X-ray diffraction (XRD) analysis of the composite positive electrode active material of Example 1 and the overlithiated layered oxide (OLO) of Comparative Example 1.
Figure 3B:
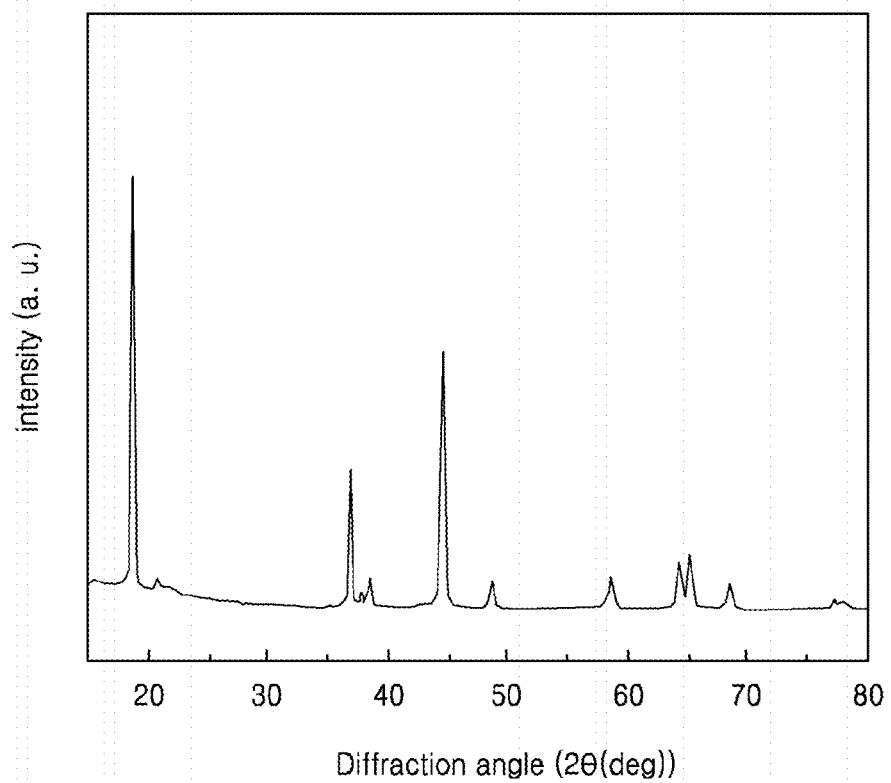
Figure 4:
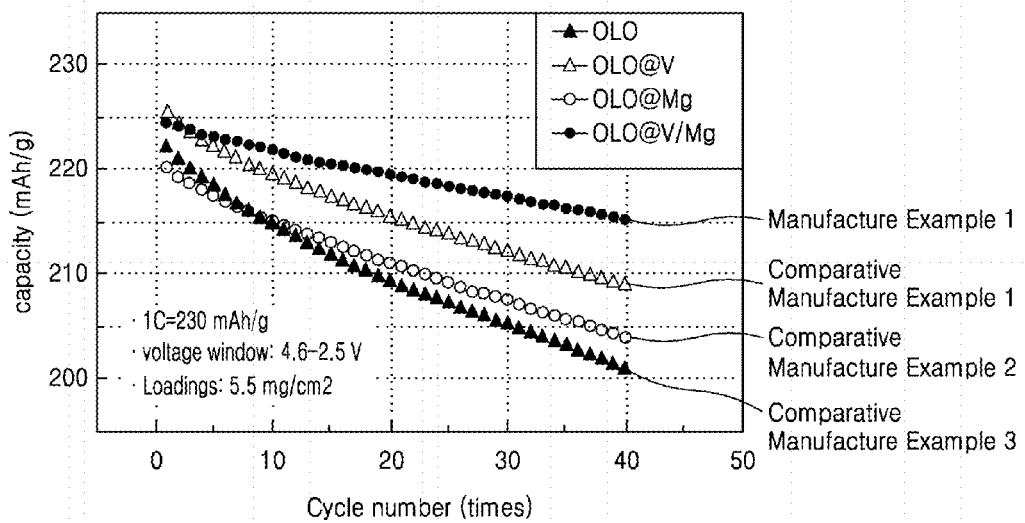
FIG. 4 is a graph of capacity (milliampere hours per gram, mAh/g) versus cycle number showing changes in the capacity of coin half-cells prepared according to Manufacturing Example 1 and Comparative Manufacturing Examples 1 to 3 over 40 cycles.
Figure 5:
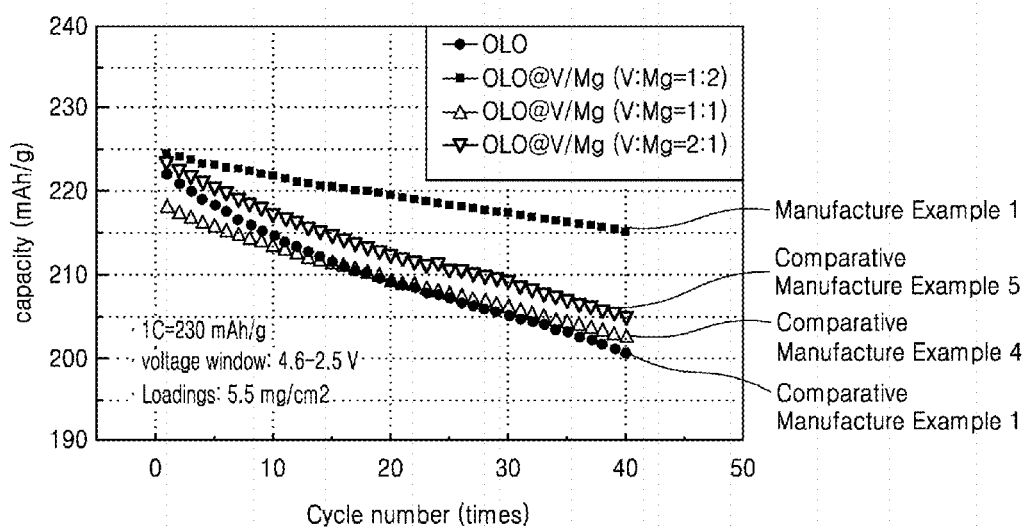
FIG. 5 is a graph of capacity (milliampere hours per gram, mAh/g) versus cycle number showing changes in the capacity of coin half-cells prepared according to Manufacturing Example 1 and Comparative Manufacturing Examples 1, 4, and 5 over 40 cycles.

The XRD results with respect to the composite positive electrode active material of Example 1 and the OLO of Comparative Example 1 are shown in FIGS. 3A and 3B.

Referring to FIGS. 3A and 3B, the composite positive electrode active material of Example 1 showed OLO characteristic peaks, and it was confirmed that the composite positive electrode active material of Example 1 was formed in a solid solution since an additional phase, such as a spinel phase, was not detected.

Evaluation Example 4: Charge and Discharge Characteristics (Lifespan)

1) Manufacturing Example 1 and Comparative Manufacturing Examples 1 to 3

The charge and discharge characteristics with respect to the coin half-cells of Manufacturing Example 1 and Comparative Manufacturing Examples 1 to 3 were evaluated by using a charge/discharge device (available by TOYO, TOYO-3100).

In detail, in the first cycle, each of the coin half-cells was charged at a constant current of 0.1 C until the voltage thereof reached 4.7 V, charged again at the same constant current, and then, discharged at the same constant current until the voltage thereof reached 2.5 V. A C rate is a measure of the rate a battery is charged or discharged relative to its maximum capacity. A 1 C rate means a current which will discharge the entire capacity in one hour. Thus, for example, for a battery with a capacity of 100 ampere-hrs, a C rate discharge would be a discharge current of 100 amperes, a 5 C rate for this battery would be 500 amperes, and a C/2 rate would be 50 amperes.

From the second cycle, each of the coin half-cells was charged at a constant current of 0.5 C until the voltage thereof reached 4.6 V, charged again at the same current voltage until the current thereof reached 0.05 C, and then, discharged at a constant current of 0.1 C until the voltage thereof reached 2.5 V. The evaluation on the charge and discharge cycles were performed 40 times under conditions of charging in accordance with 4.6V CC 1 C and discharging in accordance with 2.5V 1 C. The results showing changes in cell capacities according to the number of charge and discharge cycles are shown in Table 4.

As shown in Table 4, it was confirmed that the coin half-cell of Manufacturing Example 1 had improved lifespan characteristics, compared with the coin half-cells of Comparative Manufacturing Examples 1 to 3.

2) Manufacturing Example 1 and Comparative Manufacturing Examples 1, 4, and 5

The charge and discharge characteristics with respect to the coin half-cells of Manufacturing Example 1 and Comparative Manufacturing Examples 1, 4, and 5 were evaluated by using a charge/discharge device (available by TOYO, TOYO-3100).

In the first cycle, each of the coin half-cells was charged at a constant current of 0.1 C until the voltage thereof reached 4.7 V, and then, discharged at the same constant current until the voltage thereof reached 2.5 V. From the second cycle, each of the coin half-cells was charged at a constant current of 0.5 C until the voltage thereof reached 4.6 V, charged again at the same current voltage until the current thereof reached 0.05 C, and then, discharged at a constant current of 0.2 C/0.33 C/2 C/3 C until the voltage thereof reached 2.5 V. The evaluation on the charge and discharge cycles were performed 40 times under conditions of charging in accordance with 4.6V CC 1 C and discharging in accordance with 2.5V 1 C.

The results showing changes in cell capacities according to the number of charge and discharge cycles are shown in Table 5.

As shown in Table 5, it was confirmed that the coin half-cell of Manufacturing Example 1 had improved lifespan characteristics, compared with the coin half-cells of Comparative Manufacturing Examples 1, 4, and 5.

Evaluation Example 5: Charge and Discharge Characteristics (Initial Efficiency and Rate Capability)

Each of the coin half-cells of Manufacturing Example 1 and Comparative Manufacturing Examples 1, 4, and 5 was charged at a constant current of 0.1 C until the voltage thereof reached 4.7 V, and then, discharged at the same constant current until the voltage thereof reached 2.5 V.

From the second charge cycle, each of the coin half-cells was charged at a constant current of 0.5 C until the voltage thereof reached 4.6 V, charged again at the same current voltage until the current thereof reached 0.05 C, and then, discharged at a constant current of 0.2 C/0.33 C/2 C/3 C until the voltage thereof reached 2.5 V. The evaluation on the charge and discharge cycles were performed 40 times under conditions of charging in accordance with 4.6V CC 1 C and discharging in accordance with 2.5V 1 C.

The initial efficiency and rate capability of each of the coin half-cells are represented by Equations 1 and 2 below, respectively. Here, initial discharge capacity refers to discharge capacity in the first cycle.

$$\text{Initial efficiency} = \{(\text{discharge capacity in the 1}^{st} \text{ cycle})/(\text{charge capacity in the 1}^{st} \text{ cycle})\} \times 100 \quad \text{Equation 1}$$

$$\text{Rate capability} = \{(\text{discharge capacity during cell discharge at a constant current of 2 C or 3 C})/(\text{discharge capacity during cell discharge at a constant current of 0.2 C or 0.33 C})\} \times 100 \quad \text{Equation 2}$$

The results showing the initial efficiency and rate capability values of each of the coin half-cells are shown in Table 2.

TABLE 2

| Division | 1st cycle | | | Rate capability | |
|---|---|---|---|---|---|
| | Charge capacity at 0.1 C (mAh/g) | Discharge capacity at 0.1 C (mAh/g) | Initial efficiency (%) | 2 C/ 0.2 C (%) | 3 C/ 0.33 C (%) |
| Manufacturing Example 1 | 316 | 290 | 92 | 85 | 82 |
| Comparative Manufacturing Example 1 | 315 | 285 | 91 | 82 | 80 |
| Comparative Manufacturing Example 4 | 309 | 275 | 89 | 84 | 81 |
| Comparative Manufacturing Example 5 | 306 | 275 | 90 | 84 | 81 |

Referring to Table 2, it was confirmed that the half coin-cell of Manufacturing Example 1 had improved initial efficiency and rate capability, compared with the half coin-cells of Comparative Manufacturing Examples 1, 4, and 5.

As described above, according to the one or more of the above exemplary embodiments, a composite positive electrode active material includes a composition doped with a combination of vanadium and magnesium. When a positive electrode including the composite positive electrode active material is used for a lithium secondary battery, the battery having improved lifespan characteristics may be used.

It should be understood that the exemplary embodiments described therein should be considered in a descriptive sense only and not for purposes of limitation. Descriptions of features, advantages, or aspects within each exemplary embodiment shall be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite positive electrode active material comprising:
   an overlithiated layered oxide comprising vanadium and magnesium,
   wherein the vanadium and the magnesium have a molar ratio of about 1:2.

2. The composite positive electrode active material of claim 1, wherein a molar content of lithium in the overlithiated layered oxide is greater than an anion content, wherein the anion content is a total molar content of F, Cl, Br, and I, if present, and one half of a molar content of oxygen and sulfur, if present.

3. The composite positive electrode active material of claim 1, wherein a molar ratio of vanadium to magnesium is about 0.9:2 to about 1.1:2.

4. The composite positive electrode active material of claim 1, wherein the composite positive electrode active material is represented by Formula 1:

$$Li_aNi_xCo_yMn_zV_bMg_{2b}M_cO_{(2-e-f/2)}S_eM'_f \quad \text{Formula 1}$$

wherein, in Formula 1, $1.0 < a \leq 1.4$, $0 < x < 1$, $0 \leq y < 1$, $0 < z < 1$, $0 < b < 1$, $0 \leq c < 1$, and $y+z+b+2b+c<1$, $0 \leq e<1$, $0 \leq f<1$, M is at least one selected from gallium, silicon, tungsten, molybdenum, iron, chromium, copper, zinc, titanium, aluminum, and boron, and M' is at least one selected from F, Cl, Br, and I.

5. The composite positive electrode active material of claim 4, wherein the V and Mg are included in a crystal structure of the overlithiated layered oxide at a position of at least one selected from Ni, Co, and Mn, and
   wherein the S and M', if present, are included in the crystal structure of the overlithiated layered oxide at an oxygen position.

6. The composite positive electrode active material of claim 4, wherein, in Formula 1, b is in a range from about 0.001 to about 0.03.

7. The composite positive electrode active material of claim 4, wherein, in Formula 1, $1.1<a<1.3$ and $0.471<z<1$.

8. The composite positive electrode active material of claim 1, wherein the composite positive electrode active material is represented by Formula 2 below:

$$Li_aNi_xCo_yMn_zV_bMg_{2b}M_cO_2 \quad \text{Formula 2}$$

wherein, in Formula 2, $1.0<a \leq 1.4$, $0<x<1$, $0 \leq y<1$, $0<z<1$, $0<b<1$, $0 \leq c<1$, and $0<x+y+z+b+2b+c<1$, and M is at least one selected from Ga, Si, W, Mo, Fe, Cr, Cu, Zn, Ti, Al, and B.

9. The composite positive electrode active material of claim 1, wherein the composite positive electrode active material is represented by Formula 3 below:

$$Li_aNi_xCo_yMn_zV_bMg_{2b}O_2 \quad \text{Formula 3}$$

wherein, in Formula 3, $1.0<a \leq 1.4$, $0<x<1$, $0 \leq y<1$, $0<z<1$, $0<b<1$, and $0<x+y+z+b+2b<1$.

10. The composite positive electrode active material of claim 1, wherein the composite positive electrode active material is $Li_{1.167}Ni_{0.181}Co_{0.125}Mn_{0.515}V_{0.004}Mg_{0.008}O_2$, $Li_{1.167}Ni_{0.175}Co_{0.125}Mn_{0.508}V_{0.008}Mg_{0.016}O_2$, or $Li_{1.167}Ni_{0.163}Co_{0.125}Mn_{0.496}V_{0.017}Mg_{0.034}O_2$.

11. The composite positive electrode active material of claim 1, wherein an average particle diameter of primary particles of the composite positive electrode active material is in a range from about 100 nanometers to about 250 nanometers, and an average particle diameter of secondary particles of the composite positive electrode active material is in a range from about 2 micrometers to about 20 micrometers.

12. A positive electrode comprising the composite positive electrode active material of claim 1.

13. A lithium secondary battery comprising the positive electrode of claim 12.

14. A method of manufacturing a composite positive electrode active material, the method comprising:
   mixing a metal precursor for forming an overlithiated layered oxide, a vanadium precursor which comprises vanadium, and a magnesium precursor which comprises magnesium to form a precursor mixture, wherein a molar ratio of the vanadium to the magnesium in the precursor mixture is about 1:2;
   drying the precursor mixture to form a dried mixture;
   mixing the dried mixture with a lithium precursor; and
   heat treating the dried mixture and the lithium precursor to manufacture the composite positive electrode active material.

15. The method of claim 14, further comprising dispersing the precursor mixture, wherein the dispersing comprises milling.

16. The method of claim 14, wherein the drying comprises spray-drying.

17. The method of claim 14, wherein the heat treating comprises heat treating at a temperature of about 600° C. to about 900° C.

18. The method of claim 14, wherein the metal precursor comprises a nickel precursor comprising nickel, a manganese precursor comprising manganese, and a cobalt precursor comprising cobalt.

* * * * *